United States Patent [19]

Wakagi et al.

[11] Patent Number: 5,278,661
[45] Date of Patent: Jan. 11, 1994

[54] IMAGE PICKUP APPARATUS WHEREIN OUTPUT SIGNALS IN ONE FIELD ARE TRANSFERRED TWO FILTER ELEMENTS AND IN THE OTHER FIELD THEY ARE FIRST TRANSFERRED ONE FILTER ELEMENT AND SUBSEQUENTLY A SECOND FILTER ELEMENT

[75] Inventors: Toru Wakagi, Tokyo; Atsushi Kobayashi, Kanagawa, both of Japan

[73] Assignee: Sony Corporation, Tokyo, Japan

[21] Appl. No.: 821,828

[22] Filed: Jan. 17, 1992

[30] Foreign Application Priority Data

Jan. 18, 1991 [JP] Japan .................. 3-019564

[51] Int. Cl.⁵ .................. H04N 3/14; H04N 5/335; H04N 9/07
[52] U.S. Cl. .................. 358/213.24; 358/213.22; 358/44
[58] Field of Search .................. 358/43, 44, 213.22, 358/213.23, 213.24, 213.15; H04N 9/07

[56] References Cited

U.S. PATENT DOCUMENTS

| | | | |
|---|---|---|---|
| 4,761,689 | 8/1988 | Takatsu et al. | 358/213.22 |
| 4,831,453 | 5/1989 | Takemura | 358/213.23 |
| 4,851,917 | 7/1989 | Ohzu | 358/213.22 |
| 4,878,121 | 10/1989 | Hynecek | 358/213.22 |
| 4,924,316 | 5/1990 | Kobayashi et al. | 358/44 |
| 4,972,254 | 11/1990 | Endo et al. | 358/44 |
| 4,985,758 | 1/1991 | Hashimoto | 358/44 |
| 5,060,073 | 10/1991 | Yamaguchi et al. | 358/213.24 |

Primary Examiner—Joseph Mancuso
Assistant Examiner—Wendy R. Greening
Attorney, Agent, or Firm—Hill, Steadman & Simpson

[57] ABSTRACT

A solid-state image pickup apparatus of the type from which signal charge can be read out for two lines at a time, wherein the amount of smear is made equal at locations above and below a point light source on a screen and a correcting circuit for such smear amount can be constructed in a simplified structure. In the solid-state image pickup apparatus, in a first field, a vertical transferring section is driven, immediately after signal charge has been read out from light sensitive sections, to transfer the signal charge by a two stage distance. But in a second field, immediately before reading of signal charge from the light sensitive sections, the vertical transferring section is driven to effect transfer by a one stage distance and then driven, immediately after such reading of signal charge, to effect transfer by another one stage distance, whereafter it is driven to effect transfer by a two stage distance upon each transferring operation.

5 Claims, 2 Drawing Sheets (K: EVEN NUMBER)

IMAGE PICKUP APPARATUS WHEREIN OUTPUT SIGNALS IN ONE FIELD ARE TRANSFERRED TWO FILTER ELEMENTS AND IN THE OTHER FIELD THEY ARE FIRST TRANSFERRED ONE FILTER ELEMENT AND SUBSEQUENTLY A SECOND FILTER ELEMENT

BACKGROUND OF THE INVENTION

1. Field of the Invention

This invention relates to a solid-state image pickup apparatus, and more particularly to a solid-state image pickup apparatus from which signal charge for two lines can be read out at a time.

2. Description of the Prior Art

A solid-stage image pickup apparatus is already known and disclosed, for example, in Japanese Patent Laid-Open Application No. 62-92587 which includes a plurality of light sensitive sections disposed two-dimensionally for individual picture elements in horizontal and vertical directions, a vertical transferring section including a plurality of vertical shift registers for transferring signal charge, read out from the light sensitive sections, in the vertical direction by two line for one horizontal blanking period, and a horizontal transferring section including a pair of horizontal shift registers connected in parallel to each other to output ends of the vertical transferring section for transferring two-line of signal charges, supplied from the vertical transferring section, at a time in the horizontal direction, and for reading out two-line of signal charges at a time. Here, a row of picture elements in the horizontal direction is referred to as line.

Where a solid-state image pickup apparatus is employed, for example, for a color video camera, a predetermined color filter is provided for each of a plurality of light sensitive sections so that each picture element may have a predetermined spectral sensitivity characteristic in order to obtain a color signal. Such color filters are arranged, in some conventional solid-state image pickup apparatus, in such a coding pattern that a color filter A and another color filter C are disposed alternately in each odd-numbered line while a further color filter B and a still further color filter D are disposed alternately in each even-numbered line as shown in FIG. 2.

With such solid-state image pickup apparatus of the type from which signal charge of two lines is read out at a time as described above, transfer in the vertical direction takes place, in each transferring operation, for two lines for part of a horizontal blanking period, but for any other period, signal charge stops in the vertical shift registers. Accordingly, for a portion of each horizontal blanking period in which vertical transfer is not performed, the solid-state image pickup apparatus is liable to be considerably influenced by a smear caused by light admitted in through openings in which the color filters are disposed. Thus, light may be introduced into a vertical shift register through a color filter A or C in an odd-numbered line, but through a color filter B or D in an even-numbered line. Consequently, the amount of such smear will be different for each line.

Here, reading of signal charge in an interlacing fashion is examined. Normally, in a first field, signal charge a from a picture element of a color filter A is transferred, upon transferring operation after it has read out into a vertical shift register, by a two step distance in the vertical shift register as seen from FIG. 4(A). In this instance, a smear component originating from light incident through the color filter A of the picture element for which the signal charge a has been read out is dominant as a smear component included in the signal charge. Meanwhile, in a second field, signal charge a of a picture element of the color filter A is transferred, due to interlacing reading, by a one step distance immediately after it has been read into the vertical shift register, and then transferred, upon each transferring operation, by a two step distance in the vertical shift register. In this instance, although a smear component originating from light incident through the color filter A is dominant, before reading, as a smear component included in the signal component a, since the signal charge a is transferred, after reading, by a two step distance from the position corresponding to a color filter B, a smear component originating from light incident through the color filter B is mixed principally, and consequently, such two smear components are finally included in a mixed condition in the signal charge being transferred.

In this manner, such conventional solid-state image pickup apparatus of the type which reads two lines at a time as described above is disadvantageous, in reading signal charge in an interlacing fashion, in that (1) an amount of smear included in signal charge for a same picture element is different between first and second fields, and that (2) in a second field, the level of a smear component is different whether a point light source is located at an upper location or a lower location of a screen.

The second disadvantage arises from the fact that, since a smear component is overlapped with signal charge which has passed a location around a point light source, when considered from a second field, a smear component at an upper location of a screen originates from light incident through the color filter before reading, but a smear component at a lower location of the screen originates from light incident through the color filter B after reading.

As a result, a smear component may be colored extraordinarily after signal processing, or an amount of smear may look different at upper and lower locations of a screen. Such phenomenon causes a problem that, particularly when correction to reduce an amount of smear is to be made, a circuit for such correction is complicated, and so forth.

SUMMARY OF THE INVENTION

It is an object of the present invention to provide a solid-state image pickup apparatus wherein the amount of smear is made equal at locations above and below a point light source on a screen and a correcting circuit for such smear amount can be constructed in a simplified structure.

In order to attain the object, according to the present invention, there is provided a solid-state image pickup apparatus, which comprises a plurality of light sensitive sections disposed two-dimensionally for individual picture elements in horizontal and vertical directions, a vertical transferring section for transferring signal charge read out from the light sensitive sections in the vertical direction for the individual vertical columns, and a horizontal transferring section for transferring signal charge for two lines, transferred thereto from the vertical transferring section, in the horizontal direction at a time, wherein the vertical transferring section is driven, in a first field, to transfer, upon each transferring operation, signal charge by a two step distance immediately after the signal charge has been read out from the light sensitive sections, but in a second field, the vertical transferring section is first driven, immediately before reading of signal charge from the light sensitive sections, to transfer signal charge therein by a one step distance, and then driven, immediately after reading of such signal charge from the light sensitive sections, to transfer the signal charge therein by another one step distance, whereafter the vertical transferring section is driven, upon each transferring operation, to transfer the signal charge by a two step distance.

In the solid-state image pickup apparatus, in a first field, the vertical transferring section is driven, immediately after signal charge has been read out from the light sensitive sections, to transfer the signal charge by a two step distance, similarly as in the conventional solid-state image pickup apparatus described hereinabove. Consequently, as a smear component included in such transfer charge, a smear originating from a color filter of a picture element for which the signal charge has been read out is dominant.

On the other hand, in a second field, reading out of signal charge is performed after the vertical transferring section is driven to effect transfer by a one step distance once, and immediately after such reading, the vertical transferring section is driven to effect transfer by another one step distance in order to effect interlaced reading, whereafter it is driven to effect transfer by a two step distance upon each transferring operation. Consequently, as a smear component included in transfer charge, a smear originating from a color filter of a picture element for which signal charge has been read is so small that it can be ignored while another smear originating from another color filter of another picture element in an adjacent line is dominant because the reading time of signal charge is short and besides vertical transfer is performed, after such reading, for two steps from an adjacent line. In other words, a smear component included in a step of the vertical transfer section always originates from light incident from a fixed color filter of a picture element, and such situation does not take place that smear components arising from different color filters of adjacent lines are present in a mixed condition in transfer charge. Accordingly, smears of different amounts particularly above and below a point light source on a screen are not present in mixed condition in signal charge for one field period. Consequently, the solid-state image pickup apparatus is advantageous in that it can contribute to simplification of a correcting circuit for reducing an amount of smear.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
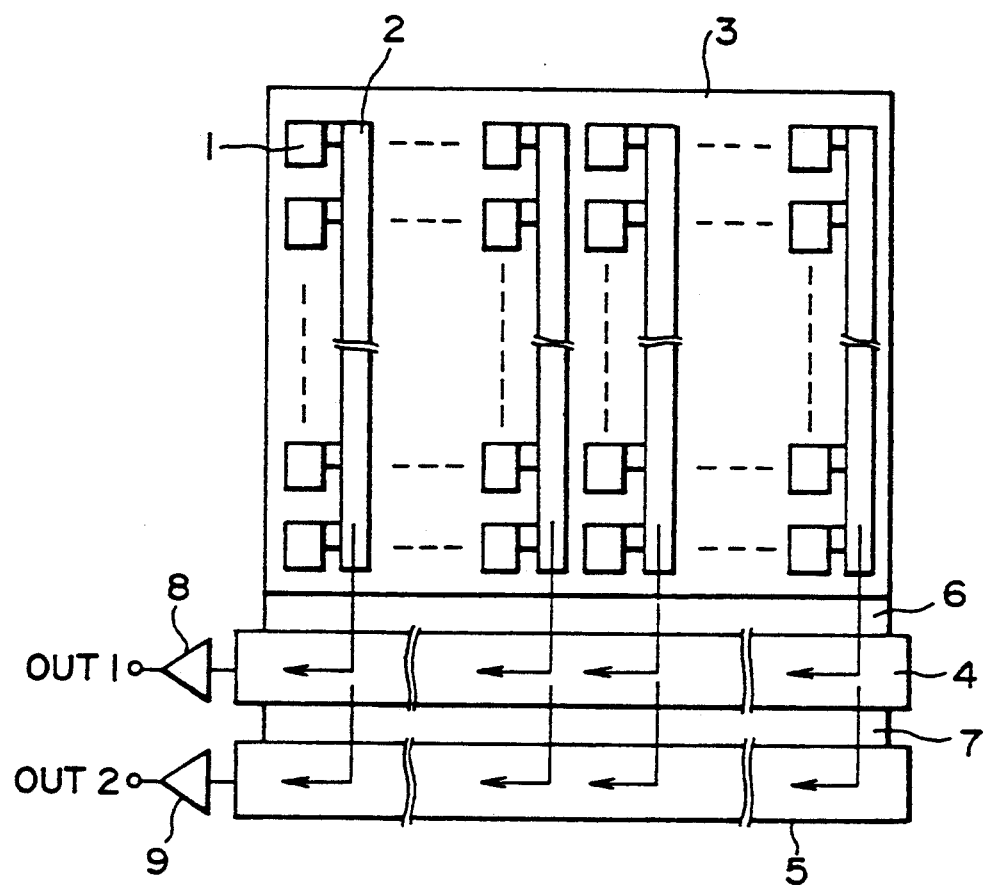
FIG. 1 is a schematic circuit diagram of a solid-state image pickup apparatus showing a preferred embodiment of the present invention.

Referring to FIG. 1, there is shown a solid-state image pickup apparatus to which the present invention is applied. The solid-state image pickup apparatus shown includes an image pickup section 3 which includes a plurality of light sensitive sections 1 disposed two-dimensionally for individual picture elements in horizontal and vertical directions for storing therein signal charge corresponding to amounts of incidence light. The image pickup section 3 further includes a vertical transferring section including a plurality of vertical shift registers 2 for transferring signal charge, read out instantaneously from the light sensitive sections 1 at part of a vertical blanking period, in the vertical direction for the individual vertical columns. Each of the vertical shift registers 2 is constituted from a shift register having a same number of steps as the number of picture elements in the vertical direction and performs a vertical transfer operation by a two step distance, details of which will be hereinafter described.

Figure 2:
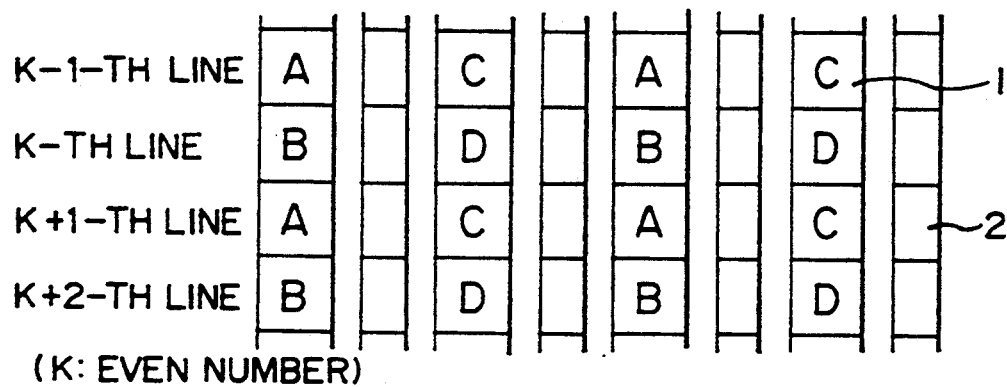
FIG. 2 is a diagrammatic representation of a coding pattern showing an arrangement of color filters.

Each of the light sensitive sections 1 of the image pickup sections 3 is constituted, for example, from a photodiode while each of the vertical shift registers 2 is constituted from a plurality of CCDs (charge coupled devices). For example, color filters A, B, C and D of four colors each having a predetermined spectral sensitivity characteristic are disposed for the light sensitive sections 1. The color filters A, B, C and D are arranged in such a coding pattern as shown in FIG. 2, wherein the color filters A and B are arranged alternately in each odd-numbered line while the color filters C and D are arranged alternately in each even-numbered line.

A pair of horizontal shift registers 4 and 5 are disposed in parallel to each other on the output side of the image pickup section 3. Transfer gates 6 and 7 are interposed between output ends of the image pickup section 3 and the horizontal shift register 4 and between the horizontal shift registers 4 and 5, respectively. A horizontal transferring section is thus constituted from the horizontal shift registers 4 and 5 and the transfer gates 6 and 7. The horizontal shift registers 4 and 5 are each constituted from a plurality of CCDs and transfer, signal charge for two lines at a time in a horizontal direction. A pair of outputting circuit sections 8 and 9 are provided at terminal ends of the horizontal shift registers 4 and 5, respectively, and are constituted, for example, from an FDA (floating diffusion amplifier). The outputting circuit sections 8 and 9 convert signal charges, into voltages and output the voltages as signal output voltages OUT1 and OUT2 therefrom, respectively.

Subsequently, a transferring operation of the vertical transferring section will be described.

Figure 3A:
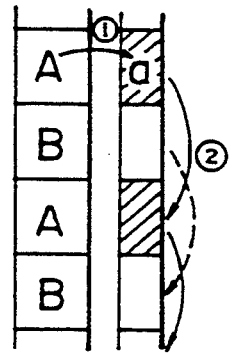
FIGS. 3(A) and 3(B) are diagrammatic representations illustrating vertical transferring operations for first and second fields, respectively.

In a first field, signal charge is first read into the vertical shift registers 2 for individual picture elements, and then the vertical shift registers 2 are driven to transfer the signal charge by two steps for each horizontal scanning period as seen from FIG. 3(A). Such driving in a first field is substantially similar as in the conventional solid-state image pickup apparatus described hereinabove. As a result of such transfer driving, signal charges read out, for example, from a picture element of a color filter A in line 1 stops sidewardly of another picture element of a color filter A in line 8 during a horizontal scanning period, and accordingly, a smear corresponding to incident light through the color filter A is dominant in the signal charge a.

Figure 3B:
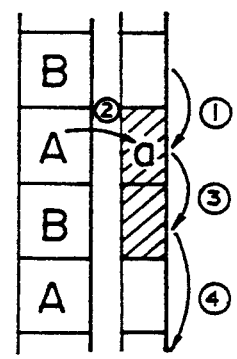
Figure 4A:
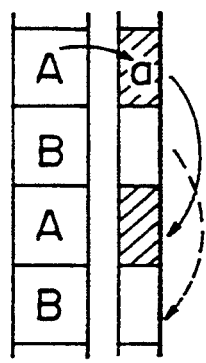
FIGS. 4(A) and 4(B) are similar views but illustrating conventional vertical transferring operations for first and second fields, respectively.
Figure 4B:
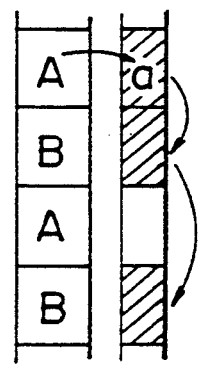

On the other hand, in a second field, the vertical shift registers 2 are firstly driven to transfer signal charge by a one step before signal charge is read into the vertical shift registers 2 for individual picture elements, and then signal charge is read into the vertical shift registers 2, and after such reading, in order to effect interlaced reading, the shift registers 2 are driven to transfer the signal charge by a one step distance, whereafter the vertical shift registers 2 are driven, upon each transferring operation, to transfer the signal charge by a two step distance, as seen from FIG. 3(B).

In this manner, in a second field, the vertical shift registers 2 are driven, immediately before reading of signal charge, to transfer signal charge by a one step distance in advance and then driven to transfer signal charge by a one step distance immediately after reading of such signal charge. Accordingly, as a smear component included in signal charge a read out from a picture element, for example, of a color filter A, a smear originating from a color filter B preceding by a one step distance to the picture element of the color filter A is dominant, and since reading of the signal charge a takes place instantaneously, such smear component preceding by a one step distance is still dominant even after transfer by a one step distance. Then, since the signal charge a is transferred by a two step distance after then, it will stop sidewardly of a picture element of a color filter B except during a transferring operation. Consequently, as a smear component included in the signal charge a, a smear component originating from the color filter B is dominant.

In particular, as for signal charge a read out from a picture element, for example, of a color filter A, a smear component originating from a color filter A is dominant in a first field, but another smear component originating from a color filter B is dominant in a second field. Thus, a smear component mixed in a step of a vertical shift register 1 always originates from only one color filter of a fixed color. Consequently, smear components of different amounts above and below a point light source on a screen are not present in mixed condition in signal charge for one field period.

Having now fully described the invention, it will be apparent to one of ordinary skill in the art that many changes and modifications can be made thereto without departing from the spirit and scope of the invention as set forth herein.

What is claimed is:

1. A solid-state image pickup apparatus, comprising a plurality of light sensitive pixels disposed two-dimensionally in horizontal and vertical directions, a vertical transferring section having outputs for transferring signal charges in the vertical direction, the charges being readout from said light sensitive pixels and wherein a step corresponds to a pixel spacing in the vertical direction, and a horizontal transferring section for transferring signal charges transferred from said vertical transferring section by two lines in the horizontal direction at a time, and means for driving said vertical transferring section in a first field and a second field wherein during the first field the signal charge is transferred by two steps after the signal charges have been read out from said light sensitive pixels, and during the second field, said drive means drives said vertical transferring section before reading of signal charges from said light sensitive pixels, to transfer signal charges by one step, and after reading of such signal charges from said light sensitive pixels, to transfer the signals charges by another one step whereafter said drive means drives said vertical transferring section to transfer the signal charges by two steps.

2. A solid-state image pickup apparatus according to claim 1, wherein said vertical transferring section includes a shift register provided for each of the vertical columns of said light sensitive pixels for transferring signal charge read out from said light sensitive pixels in the vertical direction.

3. A solid-state image pickup apparatus according to claim 2, wherein each of the shift registers is formed of a number of charge coupled devices which are equal to the number of the horizontal rows of said light sensitive pixels.

4. A solid-state image pickup apparatus according to claim 1, wherein said horizontal transferring section includes two shift registers for the two lines each formed of a number of charge coupled devices which are equal to the number of the vertical columns of said light sensitive pixels.

5. A solid-state image pickup apparatus according to claim 4, further comprising a pair of transfer gates with one mounted between the output of said vertical transferring section and one of said shift registers and the other transfer gate mounted between the one shift register and the other shift register.

* * * * *